March 5, 1929.  J. C. BLACK  1,704,588
PROCESS OF TREATING PETROLEUM OILS
Filed Feb. 6, 1928
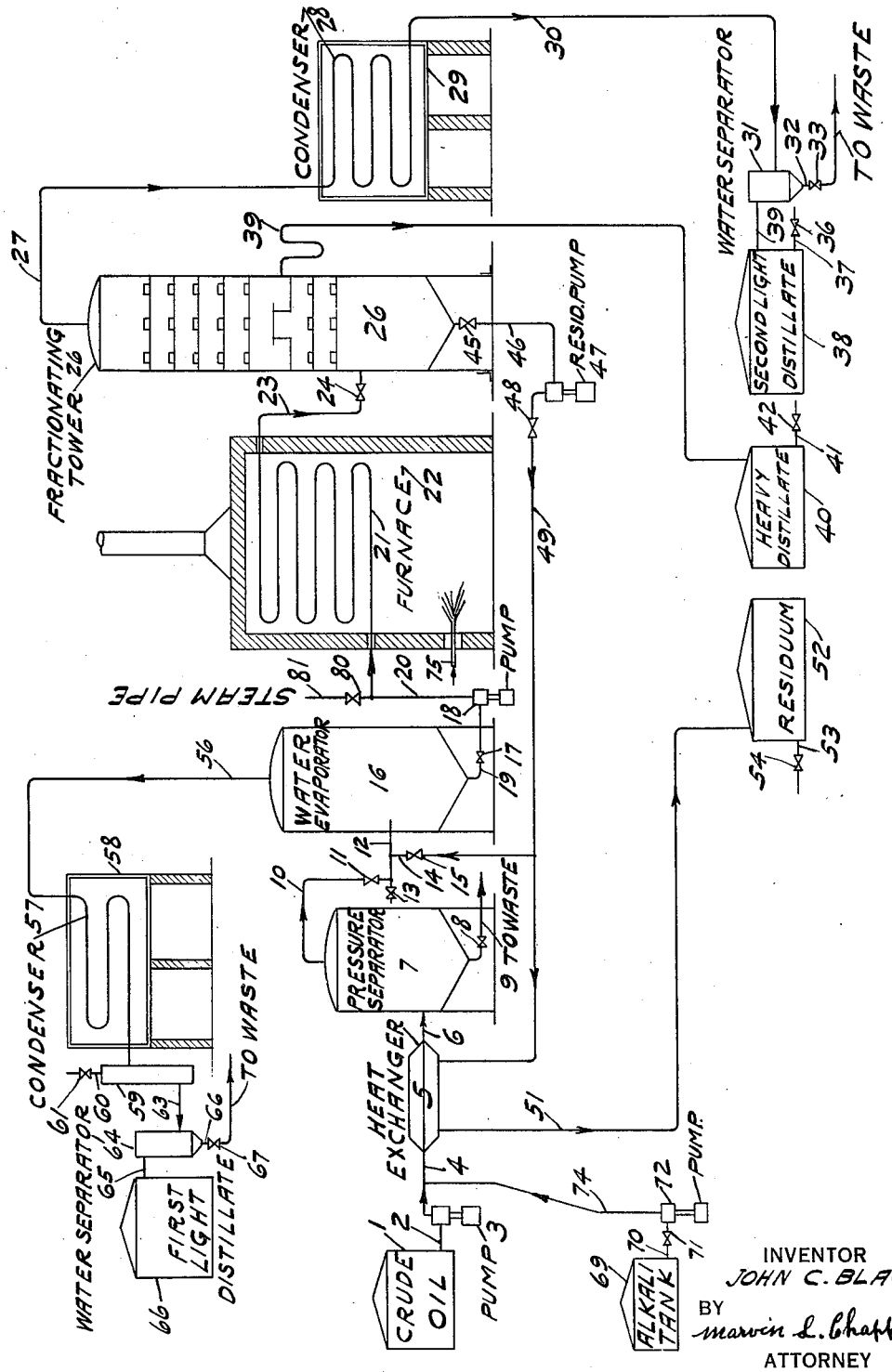
INVENTOR
JOHN C. BLACK.
BY
Marvin L. Chappell
ATTORNEY

Patented Mar. 5, 1929.

1,704,588

UNITED STATES PATENT OFFICE.

JOHN C. BLACK, OF LOS ANGELES, CALIFORNIA, ASSIGNOR TO PAN AMERICAN PETROLEUM COMPANY, OF LOS ANGELES, CALIFORNIA, A CORPORATION OF CALIFORNIA.

PROCESS OF TREATING PETROLEUM OILS.

Application filed February 6, 1928. Serial No. 252,354.

This invention relates to the treatment of crude petroleum oils by which they are better prepared for refining, and in the case of emulsions, are adapted for a successful separation of their water content and conversion of corrosive salts into non-corrosive compounds.

Much of the crude oil as it comes from the wells is emulsified with varying percentages of water which will not separate on standing, due to the presence of certain small percentages of emulsifying agents, which I believe are mostly due to asphaltic matter and petroleum organic acid salts, such for example, as calcium or magnesium petroleum acid soaps and asphaltenes. Furthermore, there are usually dissolved in the water which is emulsified with petroleum oils, varying percentages of metallic halides, some of which decompose during the distillation operation with the concurrent formation of halide acids, such for example, as hydrochloric acid, which is formed by the decomposition of magnesium or calcium chloride at elevated temperatures. The halide acid formed by the decomposition of metallic halide salts forms a very corrosive gas which causes a slow destruction of the distilling equipment. To prevent this destructive action, sufficient amounts of ammonia or other bases are usually employed, and while these methods are effective to prevent the said destructive action, a considerable expense is added to the distillation operation.

I have discovered that the formation of halide acids can be prevented and substantially all the emulsified water and salts separated from the crude petroleum oil by an economical sequence of operations, involving first commingling the emulsified crude petroleum oil with the requisite quantity of a water solution of an alkali, such as sodium or potassium hydroxide, or sodium or potassium carbonate followed by a heating and settling operation under pressure, a withdrawal of the water and salts separated therefrom, and then commingling the separated crude petroleum oil with the requisite quantity of hot residual oil coming from the distillation operation, in quantities sufficient to raise the temperature of the crude petroleum oil to a temperature above the boiling point of water, thereby converting the remainder of the emulsified water into steam, which is separated from the crude petroleum oil and condensed along with certain percentages of vaporized low boiling hydrocarbons.

Preferably, a concentrated water solution of carbonate of soda, or carbonate of soda containing bicarbonate of soda such as natural soda, or trona, may be employed, although sodium or potassium hydroxides also may be successfully used.

I am aware that the use of carbonate of soda or caustic alkalies are well-known in the art of treating crude petroleum oils.

The novelty of my invention consists in the economical employment of the residual heat from a distilling operation in conjunction with the use of water soluble alkalies for the complete separation of water and corrosive salts from crude petroleum oil containing the same, and at the same time preheating the crude petroleum oil to be distilled, thereby also effecting a saving of the heat required for the distillation operation.

With the foregoing preliminary explanation, the preferred embodiment of my invention will now be explained by reference to the accompanying drawing, which is a diagrammatical representation of an apparatus in which the invention may be performed.

In the drawing, 1 represents generally a crude oil storage tank. A pipe 2 connects the crude oil storage tank at the bottom to the suction side of a pump 3. A pipe 4 connects the heat exchanger 5 to the discharge side of the pump 3. 69 represents generally a storage tank for holding the alkali solution, which may be a water solution of carbonate of soda or caustic soda. A pipe 70 controlled by a valve 71 connects the alkali storage tank 69 at the bottom to the suction side of a pump 72. A pipe 74 connects the discharge side of the pump 72 to the pipe 4. A pipe 6 connects the heat exchanger 5 to "pressure separator" 7. A pipe 10 controlled by the valve 11 connects the "pressure separator" to pipe 12. A pipe 9 controlled by the valve 8 connects the "pressure separator" 7 at the bottom and leads to a source not shown. A pipe 12 connects the pipe 10 to "water evaporator" 16, and is provided with a valve 13 for cleaning out the pipe 12 when necessary. A pipe 56 connects the "water evaporator" 16 at the top, to a condenser 57. The condenser coil 57 is contained in the condenser box 58. The condenser coil 57 is connected to a "gas trap" 59 which is provided at the top with a pipe 60 controlled by a valve 61. A pipe 63 connects the "gas trap" 59 to a "water separator" 64. The "water separator" 64 is provided with an outlet pipe 66 at the bottom controlled by the valve 67. A pipe 65 connects the "water separator" 64 to the "first light distillate" tank 66. A pipe 19 controlled by the valve 17 connects the "water evaporator" 16 at the bottom to the suction side of a pump 18. A pipe 20 connects the discharge side of pump 18 to heater coil 21. The heater coil 21 is contained in the top of furnace 22. The furnace 22 is provided with a burner 75 which leads to a source of fuel not shown. A pipe 23 controlled by the valve 24 connects the heater coil 21 at the top to the bottom of a fractionating tower 26. A pipe 27 connects the fractionating tower 26 at the top to a condenser 28. A pipe 39 connects the fractionating tower 26 near the middle to a "heavy distillate" storage tank 40. A pipe 46 controlled by a valve 45 connects the fractionating tower 26 at the bottom to the suction side of a pump 47. A pipe 49 controlled by a valve 48 connects the discharge side of pump 47 to the heat exchanger 5. The condenser coil 28 is positioned in the condenser box 29. A pipe 30 connects the condenser coil 28 to a "water separator" 31. The "water separator" 31 is connected by a pipe 32, controlled by a valve 33, and leads to a source of waste not shown. A pipe 39 connects the "water separator" 31 to "second light distillate" tank 38. The "heavy distillate" tank 40 is provided with an outlet pipe 41 controlled by a valve 42. The "second light distillate" tank 38 is provided with an outlet pipe 37 controlled by valve 36 which leads to a source not shown. A pipe 51 connects the heat exchanger 5 to "residuum" tank 52. The "residuum" tank 52 is provided with an outlet pipe 53 controlled by valve 54. A steam pipe 81, controlled by valve 80, is connected to the pipe 20.

The preferred process as carried out with the apparatus just described is as follows:

Crude petroleum oil, containing emulsified water and corrosive metallic halide salts, which may range from a fraction of a per cent to as high as 10 per cent by volume or higher, contained in the storage tank 1, is continuously permitted to flow through the pipe 2 and into the suction side of pump 3, which discharges the oil into pipe 4 where it meets and is commingled with the necessary quantity of a water solution of an alkali sufficient to convert the corrosive metallic halide salts into non-corrosive compounds. The crude petroleum oil and products of emulsion commingled with the necessary quantity of a water solution of carbonate of soda, sodium hydroxide, or other water soluble alkalies, which may range from ¼ to as high as 2 per cent by volume of a saturated water solution of carbonate of soda or a 30 to 50 degree Bé. sodium hydroxide water solution, to convert substantially all of the corrosive metallic halide salts into non-corrosive compounds (magnesium carbonate, calcium carbonate, magnesium oxide and the like), pass through exchanger 5 in counterflow to the outgoing hot residual oil and are heated to an approximate temperature ranging from 180 to 250 degrees F., thereby completing the chemical reaction between the alkali and the metallic halide salts. The commingled products pass from the heat exchanger 5 into "pressure separator" 7 which is maintained at a pressure ranging from 1 to as high as 100 pounds gauge, where the major portion of the water and the contained salts, including the products of reaction, separate from the oil and are drawn off through the pipe 9 which leads to a source of waste not shown by operating valve 8. The crude petroleum oil free from the major portion of the emulsified water and products of the chemical reaction pass from the "pressure separator" 7 through the pipe 10, pipe 12 and into the "water evaporator" 16, valve 11 being open and valve 13 being closed. The crude petroleum oil in evaporator 16 is maintained at a temperature ranging from 250 to 350 degrees F., by the introduction of a continuous stream of hot residuum coming from the bottom of fractionating tower 26 through the pipe 46 controlled by the valve 45.

Pipe 46 is connected to the suction side of "residuum pump" 47 which discharges the hot oil into pipe 49 controlled by the valve 48. The pipe 49 is connected by a branch pipe 14 to the pipe 12, controlled by the valve 15. The hot residual oil after passing into the pipe 12 is commingled with the oil coming from "pressure separator" 7 and passes into "water evaporator" 16. The temperature of the mixed oils in the "water evaporator" 16 is such that all of the water and a certain percentage of low boiling hydrocarbons are converted into vapors which pass up through the pipe 56 and into the condenser 57. The vaporized water and the major portion of the low boiling hydrocarbons passing into the condenser 57 are condensed to a liquid and pass into "gas trap" 59, where the uncondensed hydrocarbons are separated from the condensed products and pass out of the system through the pipe 60, controlled by the valve 61. The condensed water and low boiling hydrocarbons pass from "gas trap" 59 through pipe 63 and into the "water separator" tank 64 where the water is separated from the condensed oil and passes out of the system through pipe 66, controlled by valve 67. The condensed oil collecting in "water separator" 64 passes through pipe 65 and into the "first light distillate tank" 66 and is thereafter mixed with the naphtha from the distillation operation and employed for gasoline stock. From "water evaporator" 16 the crude petroleum oil free from water and corrosive metallic halide salts passes through the pipe 19 controlled by the valve 17 and into the suction side of pump 18. The pump 18 discharges the preheated crude petroleum oil through pipe 20 and the heater coil 21, which is connected to the lower part of fractionating tower 26 by the pipe 23 controlled by the valve 24. The crude preheated petroleum oil as it passes through pipe 20 is commingled with the requisite quantity of steam from steam pipe 81 controlled by valve 80 and is then passed through the heater coil 21 and heated to the desired distillation temperature which may range from 500 degrees F. to as high as 650 degrees F. or a little higher, by regulation of the burner 75 in the furnace 22, the burner 75 being connected to a pipe which leads to a source of fuel not shown. In the fractionating tower 26 the lower boiling vaporized hydrocarbons or naphtha stock are separated from the higher boiling residual oil, by fractionation and thereafter condensed on passing through the pipe 27 and condenser 28. The condensed naphtha stock is conducted through a "water separator" 31 and then into the "second light distillate" tank 38. The "water separator" 31 is provided with a pipe 32 controlled by valve 33 by means of which the water separated in the distillation operation may be conducted to a source of waste not shown. This "water separator" 31 is required only when steam is used in the distillation operation. In case steam is employed in the distillation operation, it may be introduced along with the oil during the passage through the heater coil 21 or steam may be introduced directly into the bottom of the fractionating tower 26 by pipes not shown. The fractionating tower 26 is provided with a pipe 39 connected to the middle of the fractionating tower by means of which a heavier distillate may be separated from the higher boiling hydrocarbons which pass into the heavy distillate tank 40. The higher boiling hydrocarbons separated by the distillation operation pass from the bottom of fractionating tower 26 into pipe 46 controlled by valve 45 and then into the suction side of "residuum" pump 47. Pump 47 discharges the hot residuum from the distillation operation through the pipe 49 controlled by the valve 48, a part of which is permitted to flow through the pipe 14 controlled by the valve 15 and into pipe 12 where it is commingled with and heats the incoming oil as heretofore described. The remainder of the hot residual oil from the distillation operation passes through the heat exchanger 5 where it undergoes a heat exchange with the incoming crude petroleum oil from the crude oil storage tank 2, thereby preheating the incoming crude petroleum oil to a temperature of approximately 180 to 250 degrees F. From heat exchanger 5 the residual oil passes through the pipe 51 and into the "residuum tank" 52. "Residuum tank" 52 is provided with a pipe 53 controlled by a valve 54 which leads to a source not shown.

While the process herein described is well adapted for carrying out the object of the present invention, it is to be understood that various modifications and changes may be made without departing from the spirit of the invention, and the invention includes all such changes and modifications that come within the scope of the appended claims.

What I claim is:

1. A process of preparing a crude petroleum oil for distillation, comprising commingling a crude petroleum oil containing emulsified water and corrosive metallic salts, with a water solution of an alkali in quantities sufficient to convert the corrosive metallic salts into non-corrosive compounds, heating the commingled oil and alkali water solution to a temperature sufficient to complete the chemical reaction of converting the corrosive metallic salts into non-corrosive compounds, separating under pressure and removing the major portion of the water and non-corrosive compounds from the heated oil, commingling the partially heated and treated oil with hotter residual oil in quantities sufficient to raise the temperature of the mixed oils above the boiling point of water at the pressure employed, freeing the oil of its contained water by vaporization, and then separating, condensing and collecting the vaporized water and low boiling hydrocarbons from the crude petroleum oil.

2. A process of separating emulsified water and salts from a crude petroleum oil, comprising commingling a crude petroleum oil containing emulsified water and salts with a water solution of an alkali in quantities sufficient to convert all the corrosive salts into non-corrosive compounds, heating the commingled oil and alkali water solution to a temperature sufficient to complete the chemical reaction of converting the corrosive salts into non-corrosive compounds, separating under pressure and removing the major portion of the water and non-corrosive compounds from the heated oil, commingling the partially heated and treated oil with hotter residual oil in quantities sufficient to raise the temperature of the mixed oils above the boiling point of water at the pressure employed, vaporizing all the water contained therein together with low boiling hydrocarbons, and then separating, condensing and collecting the vaporized water and low boiling hydrocarbons from the from the crude petroleum oil.

3. A continuous process of separating emulsified water and salts from a crude petroleum oil preparatory to a distillation operation, comprising commingling a crude petroleum oil containing emulsified water and corrosive metallic salts with a water solution of an alkali in quantities sufficient to convert the corrosive metallic salts into non-corrosive constituents, heating the commingled oil and alkali water solution to a temperature sufficient to complete the chemical reaction, separating under pressure and removing the major portion of the water and non-corrosive constituents from the heated oil, commingling the heated oil with hotter residual oil coming from the distillation operation in quantities sufficient to raise the temperature of the mixed oils above the boiling point of water at the pressure employed, vaporizing all the water contained therein, together with low boiling hydrocarbons, and then separating, condensing and collecting the vaporized water and lower boiling hydrocarbons from the crude petroleum oil.

4. A continuous process of treating crude petroleum oil to fractionally separate water and low boiling hydrocarbons from higher boiling hydrocarbons to prevent the introduction of corrosive constituents and water into the heating element during a distillation operation, comprising, commingling a crude petroleum oil containing emulsified water and corrosive constituents with a water solution of an alkali in quantities sufficient to convert the corrosive constituents into non-corrosive compounds, heating the commingled oil and alkali water solution to a temperature sufficient to complete the chemical reaction of converting the corrosive constituents into non-corrosive compounds, separating under pressure and removing the major portion of the water and non-corrosive compounds from the partially heated and treated oil, commingling the heated oil with hotter residual oil coming from the distillation operation in quantities sufficient to raise the temperature of the commingled oils above the boiling point of water at the pressure employed, vaporizing and separating the water and low boiling hydrocarbons from the higher boiling oils, condensing and collecting the vaporized water and low boiling hydrocarbons and then passing the petroleum oil free from water and corrosive constituents through a heating coil maintained at such a temperature that the mixed oils will be heated to a temperature approximately greater than 500 degrees F., passing the heated mixed oils into a fractionating tower and fractionally separating therefrom lower boiling fractions from a residual oil, condensing and collecting separately the separated fractions and passing a part of the residual oil in heat exchange relationship with the incoming crude oil to be purified and distilled and commingling the other part of the residual oil with the incoming oil to be distilled, to obtain a temperature of the mixed oils greater than 212 degrees F.

In testimony whereof I affix my signature.

JOHN C. BLACK.